US008826866B2

(12) United States Patent
Barendregt et al.

(10) Patent No.: US 8,826,866 B2
(45) Date of Patent: Sep. 9, 2014

(54) DUGOUT HEATING SYSTEM

(75) Inventors: Jeremy Barendregt, Grand Prairie (CA); Calvin A. G. Barendregt, Grand Junction, CO (US); Caleb Barendregt, Wembley (CA)

(73) Assignee: Certek Heat Machine Inc.

( * ) Notice: Subject to any disclaimer, the term of this patent is extended or adjusted under 35 U.S.C. 154(b) by 406 days.

(21) Appl. No.: 13/229,260

(22) Filed: Sep. 9, 2011

(65) Prior Publication Data

US 2012/0060773 A1 Mar. 15, 2012

Related U.S. Application Data

(60) Provisional application No. 61/381,176, filed on Sep. 9, 2010.

(51) Int. Cl.
*F22B 21/26* (2006.01)
*F16L 53/00* (2006.01)
*F16L 39/00* (2006.01)

(52) U.S. Cl.
CPC .............. *F16L 39/00* (2013.01); *F16L 53/002* (2013.01)
USPC ....................... 122/249; 122/20 R; 122/367.2

(58) Field of Classification Search
USPC ........ 122/20 R, 31.2, 32, 249, 133, 143, 244, 122/367.2; 126/562, 567, 568; 4/493; 392/497, 501, 502, 451
See application file for complete search history.

(56) References Cited

U.S. PATENT DOCUMENTS

| | | | | |
|---|---|---|---|---|
| 3,822,675 A | * | 7/1974 | Rychen | 122/250 R |
| 3,882,693 A | * | 5/1975 | Hiller | 62/394 |
| 4,394,562 A | | 7/1983 | Epstein et al. | |
| 4,690,205 A | * | 9/1987 | Jelbring | 165/45 |
| 4,721,067 A | * | 1/1988 | Chaix et al. | 122/32 |
| 5,320,163 A | * | 6/1994 | Stoodley | 165/80.5 |
| 5,438,712 A | | 8/1995 | Hubenthal | |
| 5,687,678 A | * | 11/1997 | Suchomel et al. | 122/250 R |
| 5,765,385 A | * | 6/1998 | Childs | 62/293 |
| 6,152,086 A | * | 11/2000 | Brouwer et al. | 122/249 |
| 6,611,660 B1 | * | 8/2003 | Sagal | 392/497 |
| 8,214,936 B2 | * | 7/2012 | Thweatt, Jr. | 4/493 |
| 2001/0046380 A1 | | 11/2001 | Lefebvre | |
| 2004/0149422 A1 | * | 8/2004 | Jungwirth | 165/47 |
| 2010/0017952 A1 | * | 1/2010 | Thweatt, Jr. | 4/493 |
| 2013/0145996 A1 | * | 6/2013 | Cooper et al. | 122/31.2 |

FOREIGN PATENT DOCUMENTS

| | | |
|---|---|---|
| CA | 2337295 A1 | 8/2002 |
| EP | 0323734 A1 | 7/1989 |
| EP | 0347124 A1 | 12/1989 |
| JP | 6033880 B2 | 5/1994 |

* cited by examiner

*Primary Examiner* — Gregory A Wilson
(74) *Attorney, Agent, or Firm* — Hiscock & Barclay, LLP

(57) ABSTRACT

A system for heating storage containers and bodies of water to prevent freezing and ice buildup. Heated fluid lines are utilized to achieve improved thermal transfer of heat energy to bodies of water.

15 Claims, 4 Drawing Sheets

DUGOUT HEATING SYSTEM

CROSS-REFERENCE TO RELATED APPLICATIONS

This application claims the benefit of U.S. Provisional Application No. 61/381,176, filed on Sep. 9, 2010, the contents of which are hereby incorporated by reference.

FIELD OF THE INVENTION

This invention relates to preventing ice buildup in storage containers. More particularly, the invention relates to providing a heating a fluid to warm a liquid inside storage devices such as dugouts, tanks and ponds. The coiled heating line thaws and prevents the accumulation of ice in a large liquid storage device and the heating of large amounts of fluid in these large storage devices.

BACKGROUND OF THE INVENTION

In particular climates it is desired to heat, thaw and prevent the freezing of fluid sources such as dugouts, tanks and ponds.

In large storage containers, keeping fluids from freezing has always been a serious problem. In the past hot oilers and heat exchangers have been used. The drawbacks of these are that they are inefficient and have high safety risks. Hot oilers arrive at a site and circulate fluid through an onboard heat exchanger, raising the temperature of the fluid to a very high temperature. In addition to being highly inefficient, these high temperatures, operating a high pressure creates a safety risk.

The hot oiler leaves the site and later returns to start the process over again. Because of the in-efficiency of the hot oiler it also makes the operating cost very high. The process of heating fluids is less efficient the higher the temperature of the fluid. It is more efficient to heat a large volume of fluid to just above freezing and keep it at this temperature constant then to heat it up to high temperature and let cool once again.

Therefore, a system for keeping high volumes of fluid from freezing is desired.

Further, a system for keeping fluids from freezing with minimal intervention is desired.

Even further, a system to provide safe, continuous heat, and to easily and quickly thaw or warm bodies of fluid is desired.

SUMMARY OF THE INVENTION

In one form the invention relates to a system for heating liquid within a storage container such as a tank, pond, dugout, cistern or the like. The storage container having a coiled heating line with an inlet and an outlet port to pass heated fluid through the coiled line. The coiled line is at least partially submerged in the fluid of the storage container.

In another embodiment, the invention relates to a system for heating liquid within a body of water. The system having a cylindrical housing having a bottom surface and an upper lid and a cylindrically coiled heating line having an inner coil, an outer coil disposed within the cylindrical housing. The cylindrically coiled heating line having a first port connected to and extending vertically from the outer coil and through the upper lid of the cylindrical housing. The cylindrically coiled heating line having a second port connected to and extending vertically from the inner coil and through the upper lid of the cylindrical housing. The cylindrically coiled heating line forming a continuous opening extending from the first port, through the outer coil, through the inner coil and to the second port.

In yet another form, the invention relates to a system for heating liquid within a body of water. The system having a boiler with a first line and second line, a cylindrical housing having a bottom surface and an upper lid and a cylindrically coiled heating line having an inner coil, an outer coil disposed within the cylindrical housing. The cylindrically coiled heating line having a first port connected to and extending vertically from the outer coil and through the upper lid of the cylindrical housing and connected to the first line. The cylindrically coiled heating line also having a second port connected to and extending vertically from the inner coil and through the upper lid of the cylindrical housing and connected to the second line. The cylindrically coiled heating line forms a continuous opening extending from the first port, through the outer coil, through the inner coil and to the second port.

In another form, the invention relates to a method for heating a body of water. The method having the steps of: Placing a cylindrical housing in a body of water, said cylindrical housing having a bottom surface, an upper lid, at least one attachment point and a cylindrically coiled heating line having an inner coil, an outer coil disposed therein. Connecting a first line of boiler to a first port that is connected to and extending vertically from the outer coil and through the upper lid of the cylindrical housing. Connecting a second line of boiler to a second port that is connected to and extending vertically from the inner coil and through the upper lid of the cylindrical housing. Pumping heated fluid from the boiler and through a continuous heating lines extending through the first line, the first port, the outer coil, the inner coil, the second port and the second line.

BRIEF DESCRIPTION OF THE DRAWINGS

The present invention is disclosed with reference to the accompanying drawings, wherein.

Corresponding reference characters indicate corresponding parts throughout the several views. The examples set out herein illustrates several embodiments of the invention but should not be construed as limiting the scope of the invention in any manner.

DETAILED DESCRIPTION

Figure 1A:
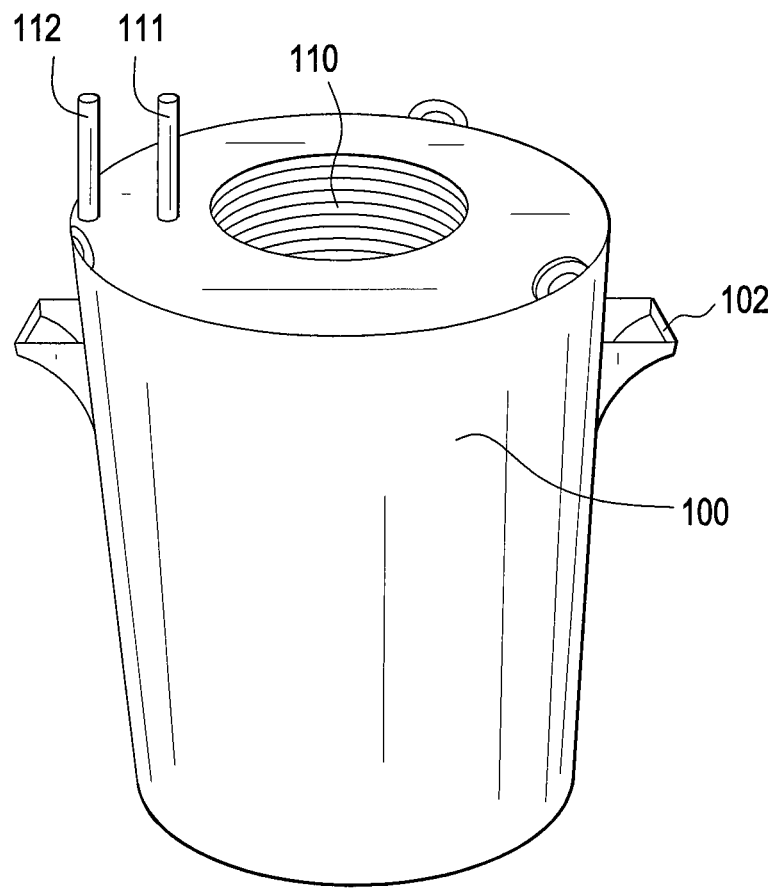
FIGS. 1A-1C are isometric views of a cylindrical housing having a cylindrically coiled heating line according to one embodiment.
Figure 1B:
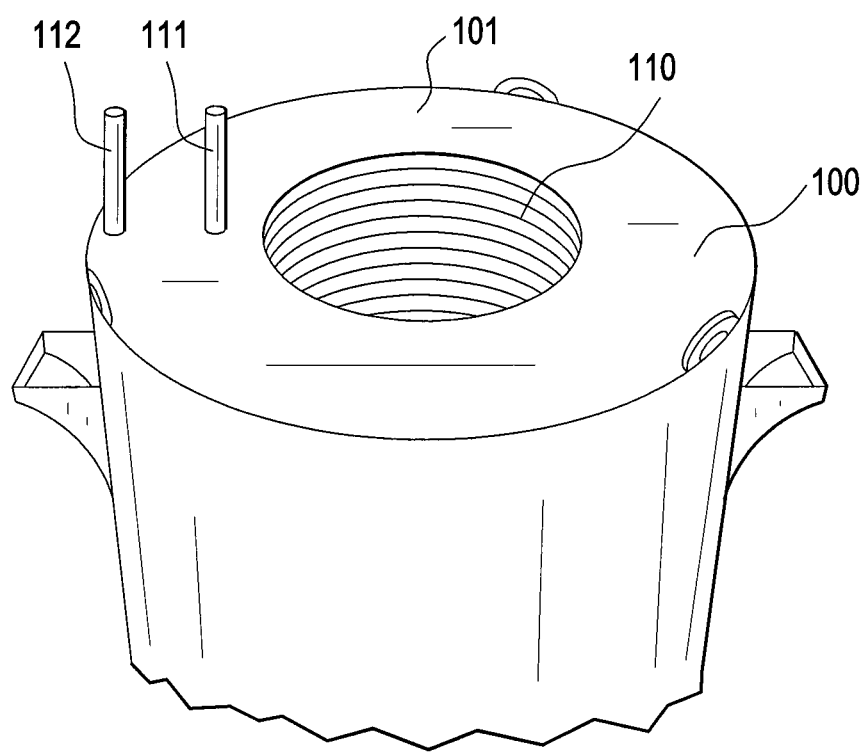
Figure 1C:
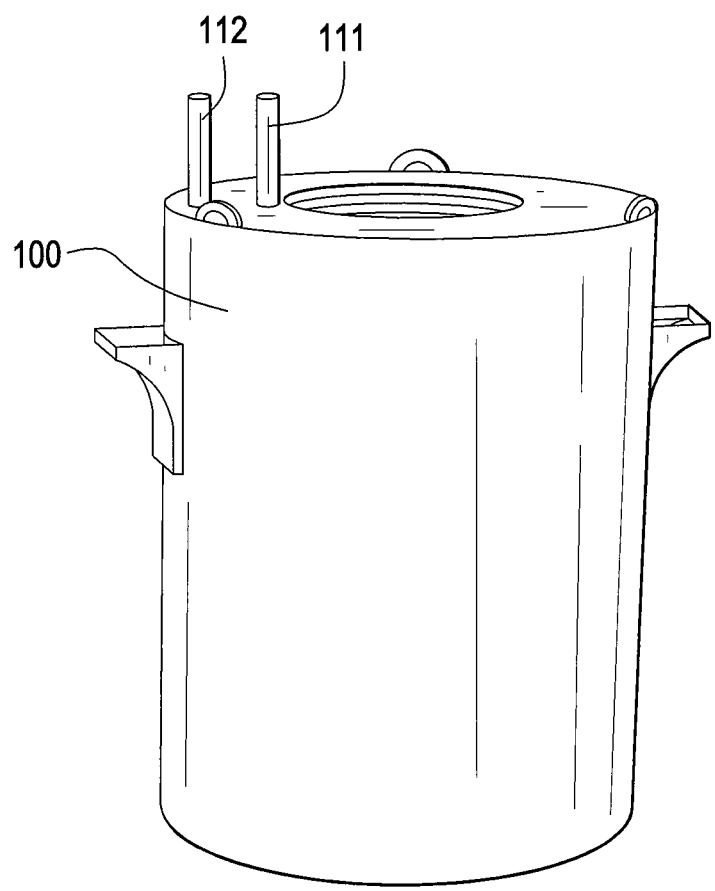
Figure 2A:
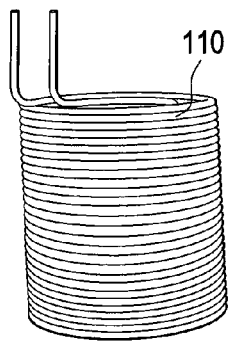
FIGS. 2A-2E are various views of the cylindrically coiled heating line.
Figure 2B:
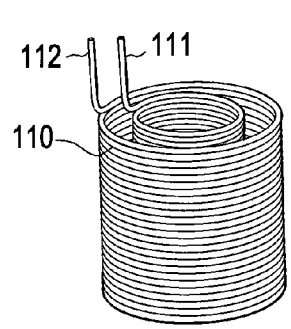
Figure 2C:
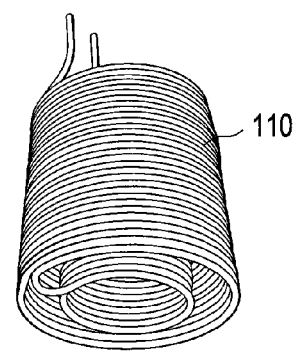
Figure 2D:
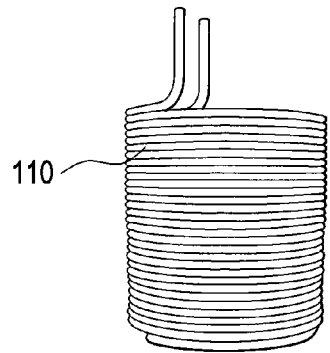
Figure 2E:
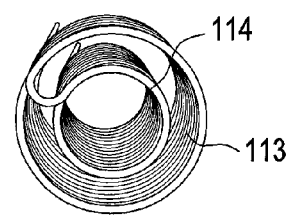

Referring to FIGS. 1A-2E, there is shown a cylindrical housing 100 having a cylindrically coiled heating line 110 within. The housing 100 has a lid 101 and at least one attachment 102. The attachment points are used to hoist the cylindrical housing into a body of water and are sufficiently rigid to support the weight of the cylindrical housing, the cylindrically coiled heating line and any fluid therein when attached to a crane and suspended in the air.

Bodies of water include, but are not limited to ponds, rivers, dugouts, cisterns and tanks. In cold weather the liquid is at risk of freezing or forming ice. To prevent freezing of the liquid, a cylindrically coiled heating line 110 inside of a cylindrical housing 100 is used. The cylindrical housing 100 is at least partially submerged in the body of water. In the instance that the body of water is frozen, the cylindrical housing 100 is placed directly on top of the ice. Heated fluid enters the cylindrically coiled heating line 110 through the inlet 111. The heating fluid travels through the length of the line thereby transferring heat to the liquid in the cylindrical housing 100, and then exits through the outlet 112. The coiled heating line 110 contains an outer coil 113 and an inner coil 114 to increase heat transfer. In one embodiment additional coils are used. In one embodiment, the cylindrically coiled heating line is made from a material that is resistant to any adverse effects of the liquid, and promotes thermal energy transfer such as copper.

The cylindrically coiled heating line 110 has an inlet 111 and an outlet 112 that extend vertically up through the lid 101 of the cylindrical housing 100. The inlet 111 and the outlet 112 provide connection points to attach fluid lines to the device. In one embodiment a boiler is used to deliver heated fluid to the cylindrically coiled heating line 110 through the inlet 111. The fluid returns to the boiler through the outlet 112. It is understood that while the inlet 111 is shown extending from the inner coil 114 and the outlet 112 is shown extending from the outer coil 113, that these ports can be switched such that the inlet extends from the outer coil and the outlet extends from the inner coil.

In one embodiment, the cylindrically heating coil line 110 self regulates the temperature of the fluid in the cylindrical housing 100. The cylindrically heating coil line 110 is attached to a buoy with a cable long enough to allow the cylindrically heating coil line 110 to be completely submerged. Hot fluid enters the inlet port 111 and circulates through the coil line 110. As the liquid is heated in the housing 100, it rises to the top and exits the housing 100, drawing fresh liquid from the bottom. As the liquid in the body of water heats, the cylindrical housing rises out of the water. The temperature and flow of the liquid exiting the top of the storage container is proportionate to the temperature of the coil, making the pod self regulating, promoting the system to operate and optimum efficiency.

In use, the dugout heating device is lowered into a body of water. A crane is attached to the attachment points of the cylindrical housing to move the dugout heating device to the desired location. Heated fluid is pumped from a boiler into the inlet port and through the cylindrically coiled heating line. The cylindrically coiled heating line having an inner and an outer coil. The cylindrically coiled heating line is made from a material that promotes heat transfer to heat the body of water in the vicinity of the dugout heating device. The heating fluid returns to the boiler through the outlet port to be reheated and the process is continued. As the heated fluid flows through the cylindrically coiled heating line the body of water is thawed (if frozen) and heated to a sufficient temperature for the desired application. Once heated, the water can be pumped away from the body of water and used, even in harsh conditions.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

PARTS LIST 100 cylindrical housing
101 lid
102 attachment point
110 cylindrically coiled heating line
111 inlet
112 outlet
113 outer coil
114 inner coil

The invention claimed is:

1. A system for heating a body of liquid, the system comprising:
    a cylindrical housing having a bottom surface, an upper lid, and at least one attachment point;
    a cylindrically coiled heated line having an inner coil, an outer coil disposed within said cylindrical housing, the cylindrically coiled heated line having heated fluid traveling therethrough for heating the liquid that is in contact with an external surface of the cylindrically coiled heated line;
    a first port connected to and extending vertically from said outer coil and through the upper lid of said cylindrical housing;
    a second port connected to and extending vertically from said inner coil and through the upper lid of said cylindrical housing; and
    said cylindrically coiled heated line forming a continuous opening extending from said second port, through said inner coil, through said outer coil and to said first port.

2. The system for heating a body of liquid according to claim 1 where said first port is an outlet port.

3. The system for heating a body of liquid according to claim 2 where said second port is an inlet port.

4. The system for heating a body of liquid according to claim 3 further comprising a pump to deliver the heating fluid to said inlet port.

5. The system for heating a body of liquid according to claim 1 wherein said attachment point is sufficiently rigid to support the weight of said cylindrical housing, said cylindrically coiled heated line and any fluid therein.

6. A system for heating a body of liquid, the system comprising:
    a boiler for heating fluid, the boiler having a first line and second line;
    a cylindrical housing having a bottom surface and an upper lid;
    a cylindrically coiled heating line having an inner coil, and an outer coil disposed within said cylindrical housing, the cylindrically coiled heating line for heating the liquid that is in contact with an external surface of the cylindrically coiled heating line;
    a first port connected to and extending vertically from said outer coil and through the upper lid of said cylindrical housing and connected to said second line;
    a second port connected to and extending vertically from said inner coil and through the upper lid of said cylindrical housing and connected to said first line for receiving the heated fluid provided by the boiler;
    said cylindrically coiled heating line forming a continuous opening extending from said first port, through said inner coil, through said outer coil and to said second port.

7. The system for heating a body of liquid according to claim 6 where said first line is a supply line and said second line is a return line.

8. The system for heating a body of liquid according to claim 7 where said first port is an inlet port.

9. The system for heating a body of liquid according to claim 8 where said second port is an outlet port.

10. The system for heating a body of liquid according to claim 6 further comprising a pump to deliver a heating fluid to said inlet.

11. The system for heating a body of liquid according to claim 6 where said cylindrical housing further comprises at least one attachment point.

12. The system for heating a body of liquid according to claim 11 wherein said attachment point is sufficiently rigid to support the weight of said cylindrical housing, said cylindrically coiled heating line and any fluid therein.

13. A method for heating a body of liquid at risk of freezing or forming ice, comprising the steps of:

placing a cylindrical housing in the body of liquid at risk of freezing such that the cylindrical housing is at least partially submerged therein, said cylindrical housing having a bottom surface, an upper lid, at least one attachment point and a cylindrically coiled heating line having an inner coil and an outer coil disposed therein, including contacting the body of liquid with an external surface of the heating line;

connecting a first line of a boiler to a first port of the heating line that is connected to and extends vertically from said outer coil and through the upper lid of said cylindrical housing;

connecting a second line of the boiler to a second port of the heating line that is connected to and extends vertically from said inner coil and through the upper lid of said cylindrical housing; and pumping heated fluid from said boiler and through a continuous heating passage comprising said second line, said second port, said inner coil, said outer coil, said first port and said first line for heating the body of liquid that is in contact with the external surface of the heating line.

14. The method of claim 13 where said first line is a return line, said second line is a supply line, said first port is an outlet port and said second port is an inlet port.

15. The method of claim 13, further comprising attaching a crane to the at least one attachment point and hoisting the cylindrical housing including the cylindrically coiled heating line therein.

* * * * *